(No Model.) 2 Sheets—Sheet 1.

D. J. DAVIDSON.
GRAVITY AND CUT-OFF GRAIN CLEANER AND GRADER.

No. 507,488. Patented Oct. 24, 1893.

Witnesses
John Schuman.
John F. Miller.

Inventor
David J. Davidson
By Attorney
Newell S. Wright.

(No Model.) 2 Sheets—Sheet 2.
D. J. DAVIDSON.
GRAVITY AND CUT-OFF GRAIN CLEANER AND GRADER.
No. 507,488. Patented Oct. 24, 1893.
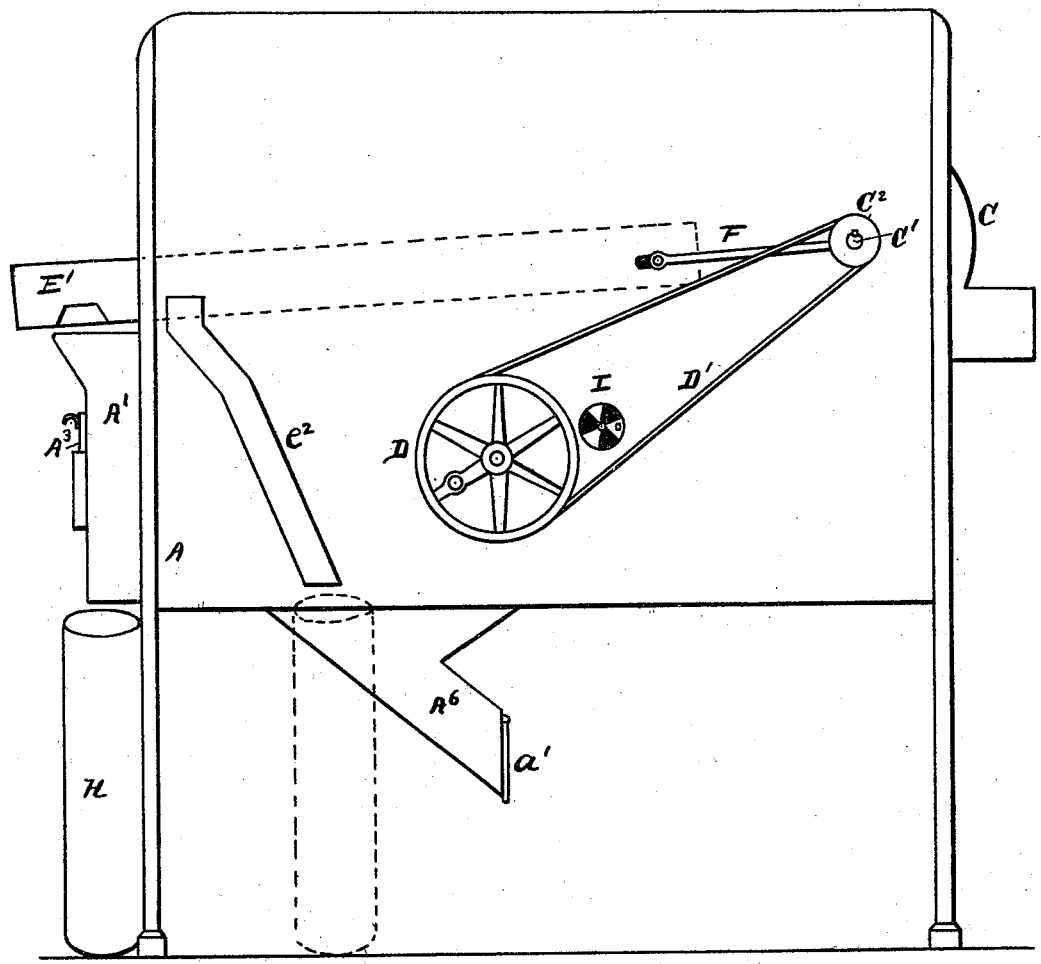
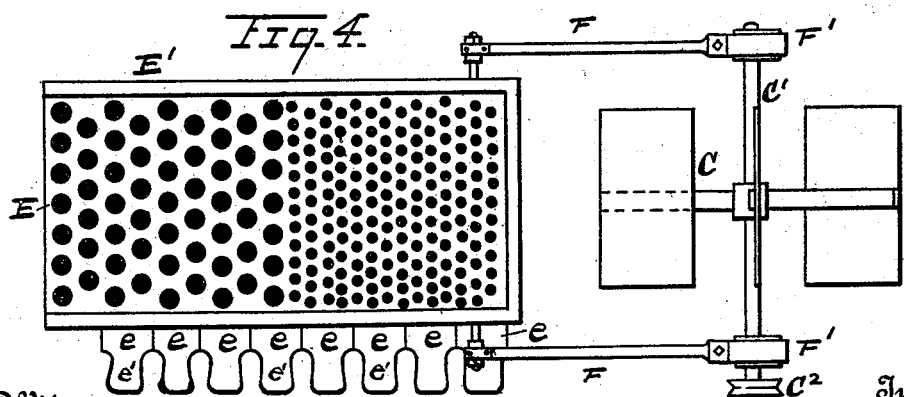
Witnesses
John Schuman
John F. Miller
Inventor
David J. Davidson
By Attorney
Newell S. Wright

UNITED STATES PATENT OFFICE.

DAVID J. DAVIDSON, OF BROCKWAY, ASSIGNOR OF TWO-THIRDS TO ABRAHAM S. MARTIN AND STEPHEN G. MARTIN, OF PORT HURON, MICHIGAN.

GRAVITY AND CUT-OFF GRAIN CLEANER AND GRADER.

SPECIFICATION forming part of Letters Patent No. 507,488, dated October 24, 1893.

Application filed January 31, 1893. Serial No. 460,385. (No model.) Patented in Canada March 2, 1893, No. 42,357.

*To all whom it may concern:*

Be it known that I, DAVID J. DAVIDSON, a citizen of the United States, residing at Brockway, county of St. Clair, State of Michigan, have invented certain new and useful Improvements in Gravity and Cut-Off Grain Cleaners and Graders, (for which I have obtained a patent in Canada, No. 42,357, bearing date of March 2, 1893;) and I declare the following to be a full, clear, and exact description of the invention, such as will enable others skilled in the art to which it appertains to make and use the same, reference being had to the accompanying drawings, which form a part of this specification.

My invention has for its object a new and useful gravity and cut off grain cleaner and grader, the same being provided with a cut off sieve cleaner, the device being of superior simplicity of construction and operation, and also of superior efficiency and utility.

My invention consists of the construction, combination and arrangement of devices and appliances hereinafter specified and claimed, and illustrated in the accompanying drawings, in which—

Figure 1:
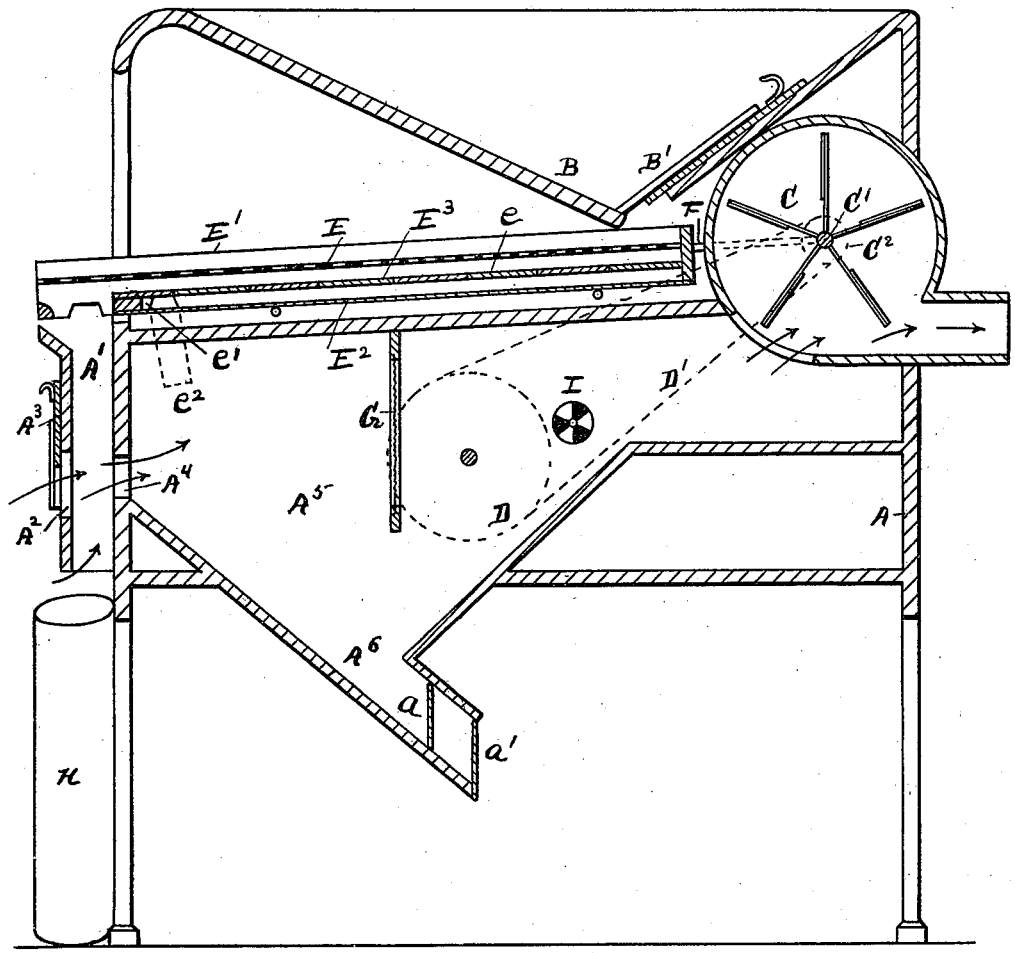
Figure 2:
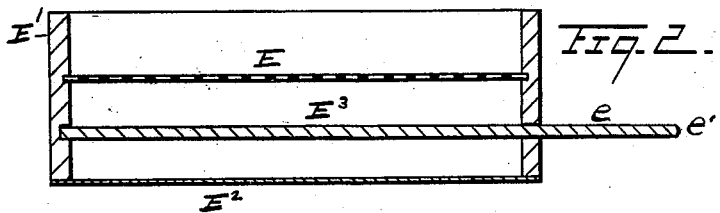

Figure 1 is a vertical section of the machine. Fig. 2 is a vertical cross section through the sieve. Fig. 3 is a side elevation of the machine. Fig. 4 is a plan view of the sieve and suction fan, the case of the latter being omitted.

My invention is more especially designed for farmers' use, to enable them to properly clean and also to grade their grain, so that the best of the grain may be separated from that which is of lighter weight or of inferior quality, as well as from all impurities, so that neither impurities, or good grain of inferior quality, or light weight, shall cause the bulk of the grain marketed to be regarded as second class by the buyer, and thus enable the seller by separating effectually his first class grain from the rest, to get a higher price, than would be the case if the lighter grain were mixed therewith. My invention is thus designed to both clean and grade the grain in a complete and satisfactory manner.

It will be understood that the machine may be operated by hand or any other desired power.

I carry out my invention as follows:

A represents the case of the machine.

B is a hopper preferably provided with a slide B' to control the rate of feed therefrom.

C denotes a suction fan of any suitable construction, and C' is the fan shaft.

D is the driving wheel, engaged upon the side of the frame and belted by a belt D' with a pulley $C^2$ upon the fan shaft.

E represents a cut off sieve, upon which the grain passes from the hopper B. This sieve is located in a case E' constructed with a fixed bottom $E^2$ and with a movable bottom $E^3$, located between the fixed bottom $E^2$ and the sieve proper. This movable bottom is constructed of a series of valves or slides "e" located edge to edge, and extending the full width of the sieve underneath the same, one end of each of the slides extending beyond the sides of the case and being formed into a handle e'. The sieve E is of finer mesh at the end thereof adjacent to the fan, the opposite end being made coarser, as shown more fully in Fig. 4. Certain finer seeds and impurities mixed with the grain in the hopper will, of course, drop through the finer portion of the sieve E. The slides "e" may be pulled out, as many as may be desired, to allow such small seed and other smaller impurities to fall upon the fixed bottom $E^2$. The chamber between the two bottoms of the sieve discharges at the end farthest from the hopper through an opening at "e'," into a spout "$e^2$." The chamber between the movable bottom and the sieve E discharges at the end of the movable bottom into a spout or duct A', which is formed upon the exterior of the rear of the case by means of three sides or walls which extend down below the screen or sieve to almost reach the top of the ordinary grain sack which is placed beneath it for the reception of the grain as it passes through the duct.

By properly adjusting the slides "e," the smaller impurities will be separated from the grain, said impurities dropping upon the fixed bottom $E^2$. The grain will be discharged through the sieve upon the slides "$e$" which are left in closed position and will be discharged therefrom into the duct $A'$. The straw and other coarser impurities will be discharged from the rear end of the sieve and fall outside the duct $A'$. The products that will pass into the duct $A'$ are the best of the grain mingled with the smaller, lighter and second class quality of grain. All the impurities, both the smaller and the coarser impurities are separated therefrom in the manner above specified.

The screen is reciprocated and shaken by means of connecting rods F connected with eccentrics $F'$ upon the fan shaft. To separate the second class quality of grain from the first class grain after the impurities have been removed therefrom, as above described, and grade the grain, the outer wall of the duct $A'$ is constructed with an orifice as at $A^2$, the size of which may be regulated by a slide $A^3$. The case A is also constructed with an adjacent opening $A^4$, preferably of more contracted size than that of the opening $A^2$. By locating the openings $A^2$ and $A^4$ near the lower end of the duct $A'$, a portion of the air is drawn through the lower end of the duct and is thus caused to pass upwardly against the descending stream of grain that is falling through the duct, which will catch any of the impurities that might by any possibility have passed the opening $A^4$ without being drawn into it by the current of air passing in through the opening $A^2$. Within the case A is formed a chamber $A^5$ through which a blast of air is drawn by the suction fan, the air being drawn in through the duct $A'$ and the opening $A^4$ into the chamber $A^5$. At the base of the chamber $A^5$ is a discharge spout $A^6$, provided with flap valves "$a$" and "$a'$," opened by the pressure of the grain from within, and closed by air suction.

Within the chamber $A^5$, I locate a screen G which may be made of flannel or of fine wire gauze, the same extended downward a desired distance from the top of said chamber and leaving a free air passage thereunder, as will be seen by referring to Fig. 1.

The operation of the grading features of my invention will now be understood and are as follows: As the grain drops into the duct $A'$, the draft of air, regulated as required, strikes it, and carries the lighter portions thereof into the chamber $A^5$ through the opening $A^4$, the air blast being concentrated at the point of said opening by reason of its more contracted area. The first class grain, of due heft will not be affected by the suction blast, but will drop by its gravity through the duct $A'$ into a bag H located therebeneath. When the lighter grain has been drawn into the chamber $A^5$, the same must of necessity pass beneath the screen G, but as said screen will allow a portion of the air blast to pass therethrough, it will be obvious that the air blast beneath the screen G will be much diminished from what it was at its entrance into said chamber. This diminution in the force of the air blast beneath the screen G will allow the lighter grain to drop by gravity into the spout $A^6$, from which it will be discharged as hereinbefore mentioned. The sides of the case A may be provided with air valves I, by means of which the force of the suction within the chamber $A^5$ can be regulated as required. It will be perceived that the suction of air does not act upon the grain until it has been discharged from the movable bottom of the sieve into the duct $A'$. Dust will therefore drop with the grain into the duct $A'$ and will be drawn with the lighter grain into the chamber $A^5$. But the force of the suction blast will still carry the dust along therewith, after the lighter grain has dropped into the spout $A^6$, and discharge it from the machine.

The provision of the sieve with the movable bottom $E^3$ formed of slides constitutes what I term a cut off sieve, as thereby the finer seeds and other impurities are cut off from passing farther along with the grain.

I prefer to extend the opening $A^2$ a little below the opening $A^4$, so as to let the air suction into the spout $A'$ under the grain, to get a good lift thereupon and carry all the light grain into the chamber $A^5$.

The object of having two flap valves "$a$" and "$a'$" is to have one closed while the other is open, so as not to lessen the force of the suction blast within the chamber $A^5$. Only one sieve is thus required for dressing up any particular kind of grain.

All the grain and impurities may be run into bags if desired.

What I claim as my invention is—

1. In a grain cleaning and grading machine, a cut off sieve provided with a fixed bottom therebelow and a movable bottom between the sieve and the fixed bottom, said bottom being formed of a series of slides, one end of each of which is extended beyond one side of the sieve and formed into a handle for removing it from the sieve substantially as described.

2. In a grain cleaning and grading machine, a case A constructed with an air chamber $A^5$, a grain duct communicating with said chamber, a suction fan to produce air suction through said duct and air chamber, and a cut off sieve constructed with a fixed bottom and with a movable bottom located above the fixed bottom, the grain upon said movable bottom discharging into said duct $A'$, the impurities discharging from the sieve and from the fixed bottom independent of the said duct, substantially as described.

3. In a grain cleaning and grading machine, the combination of a case A, a sieve supporting case $E'$ constructed with a fixed bottom $E^2$ and a movable bottom $E^3$ thereabove and spaced therefrom, a vibratory sieve located in the case $E'$ above said movable bottom and spaced therefrom, the spaces between the two bottoms and between the movable bottom and sieve having separate discharge openings toward the rear end thereof, said movable bottom composed of a series of independent slides extending at right angles to the movement of the sieve, the space between the fixed and movable bottoms cut off by the fixed bottom from communication with the interior of the case A, and the space between the movable bottom and sieve communicating with said interior, substantially as described.

4. In a grain cleaning and grading machine, a case A constructed with an interior air chamber $A^5$, a duct $A'$ communicating therewith at one side of said chamber, a suction fan located at the opposite side of said chamber, a vibratory sieve extended over the top of said duct, a movable bottom located below said sieve and spaced therefrom, a fixed bottom located below said movable bottom and spaced therefrom, said fan producing an air suction beneath said screen and through the duct $A'$ and chamber $A^5$, substantially as described.

5. In combination, an independent sieve supporting case, a sieve engaged with said case, a movable cut off bottom located below the sieve and spaced therefrom, said movable bottom composed of a series of independent valves, said case, sieve and cut off bottom made simultaneously movable, substantially as described.

6. In combination, an independent sieve supporting case, a sieve engaged therewith, a movable cut off bottom located below the sieve and spaced therefrom, and a fixed bottom located below the cut off bottom and spaced therefrom, said cut off bottom constructed of a series of independent valves, said case, with its sieve, cut off bottom and fixed bottom made simultaneously movable, substantially as described.

In testimony whereof I sign this specification in the presence of two witnesses.

DAVID J. DAVIDSON.

Witnesses:
H. E. MARTIN,
CHRISTOPHER HANNA.